(No Model.)
A. HOFFMANN.
CAR BRAKE.
No. 299,474. Patented May 27, 1884.
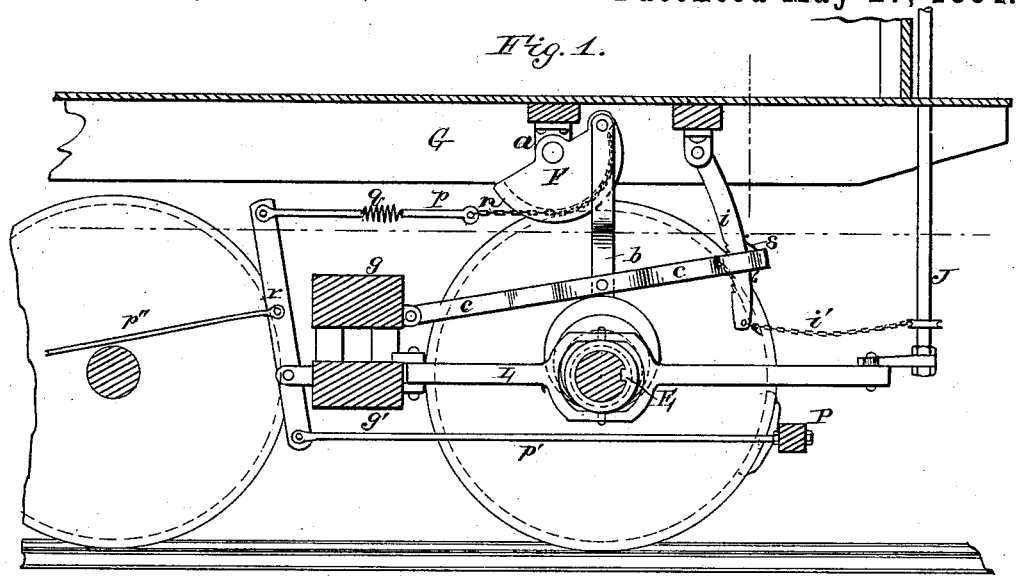
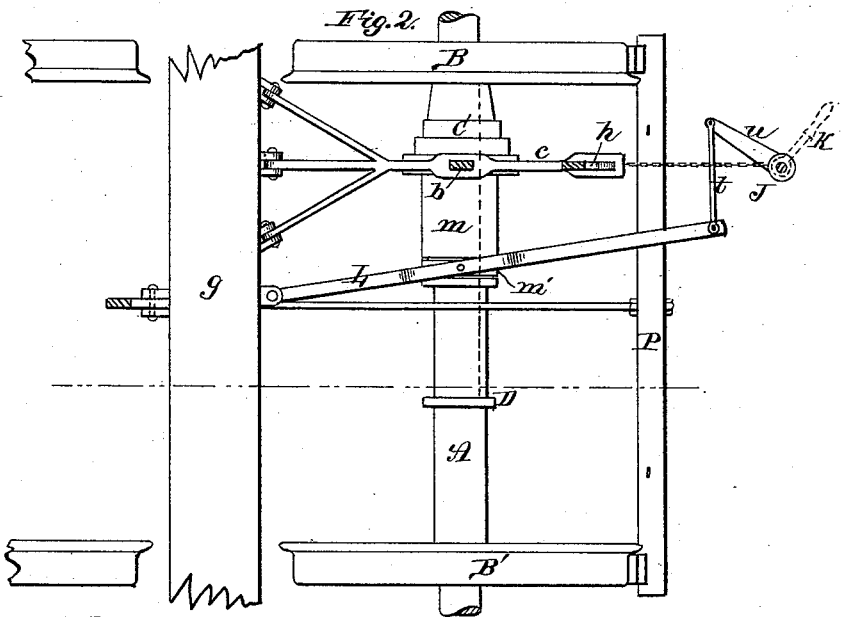
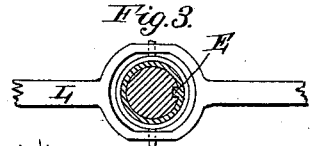
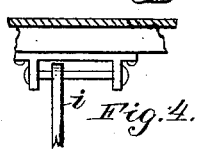
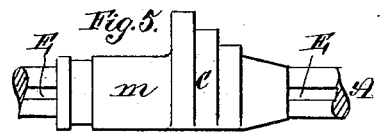
Witnesses:
Inventor
Adam Hoffmann,
per F. A. Lehmann, atty.

UNITED STATES PATENT OFFICE.

ADAM HOFFMANN, OF ALLEGHENY, PENNSYLVANIA.

CAR-BRAKE.

SPECIFICATION forming part of Letters Patent No. 299,474, dated May 27, 1884.

Application filed February 12, 1884. (No model.)

*To all whom it may concern:*

Be it known that I, ADAM HOFFMANN, a citizen of the United States, residing at Allegheny, in the county of Allegheny and State of Pennsylvania, have invented certain new and useful Improvements in Brakes for Car-Wheels, of which the following is a specification, reference being had therein to the accompanying drawings.

My invention relates to an improvement in brakes for car-wheels; and it consists in an arrangement by which eccentrics revolving with the wheel-axle are, by the operation of a lever, made to lock the wheels of a car, to retard or stop their motion, as will be fully described hereinafter.

The accompanying drawings represent my invention. Figure 1 is a side view; Fig. 2, a plan; Fig. 3, a section of the axle; Fig. 4, suspended bar $i$; Fig. 5, eccentrics.

A represents the axle of a car, that revolves with the wheels B B'. In the axle is a longitudinal groove, E, extending from the wheel B to a collar, D, and in this groove enters a key or pin that causes the eccentrics C, through which the axle passes, to turn with it, but allows them to slide between the collar D and the wheel B. The eccentrics C, attached to one another or made of one piece, have different centers, and their eccentricities increase toward the collar D. At the side facing the collar is a boss, $m$, attached to the eccentric, and near its end a ring, $m'$, that remains stationary while the boss and eccentrics turn with the axle. A semicircular wheel, F, is pivoted at $a$ to a bracket under the body of the car G, and near the circumference on this wheel are pivoted the prongs of a vertical split bar, $b$, in which, when raised or lowered, the wheel F partly turns. The lower end of the bar $b$ is pivoted over the axle to the center of a bar, $c$, that has its rear end pivoted to a bolster, $g$, and extends forward across the axle under the wheel F. The forward end of the bar $c$ has a loop or slot, $h$, and through it, from above, passes a curved bar, $i$, also suspended from a bracket under the car, which bar, on its concave edge, is dented, and engages teeth at the inside of the loop $h$ when this bar $c$ is raised, and holds it in that position, assisted by the pressure of a spring, $s$. A chain, $i'$, connects the lower end of the curved bar $i$ with the brake-bar J, which, being turned by the lever K, draws the bar $i$ to itself, and thereby disengages the teeth, causing the bar $c$ to drop and the wheel F to return to its place by being drawn down by the bar $b$.

On the wheel F is a chain, $n$, that, when the wheel is turned up by the rod $b$, pulls a rod, $p$, with it, which rod is of two pieces connected by a spiral spring, $q$. The rod $p$ is also pivoted to a lever, $r$, that has its fulcrum on a bolster, $g'$, and pivoted to the lever's other arm is a rod, $p$, attached to the brake P. The eccentrics C remain idle when at the middle of the axle with which they revolve, and are held in that position by a horizontally-movable bar, L, that has an opening near its middle, into which the boss $m$ of the eccentrics enters. The ring around the end of the boss is bolted to the bar L at its opening, so as to remain stationary when the axle turns, and being embedded in a groove, serves to draw or push the eccentrics toward or away from the wheel B when the bar is moved to either side. The forward end of the bar L is connected by a rod, $t$, and lever $u$ with the brake-bar J, and operated by it. If the lever K be turned toward the wheel B, the eccentrics are pushed in that direction by the bar L, and brought under the bar $c$, and the eccentric whose circumference diverges least from that of the axle arriving first is followed by the others if the pressure against the lever is increased and continued. By the eccentrics the bar $c$ is raised, and with it the forked bar $b$, that partly turns the wheel F, which in its turn draws the rod $p$ and its connections, by which the brakes P are brought to bear against the wheels. The eccentrics are made of different grades to bear more or less against the wheel F, to retard the motion of the wheels gradually or suddenly, as may be desired, and the object of the spring $q$ is to prevent a sudden shock when the brakes are applied with great force. The brakes on the hind wheels are simultaneously applied with those in front by means of the rod $p''$, attached to the lever $r$ between its fulcrum and the rod $p$. The lever K is here represented as operated by hand; but it can be readily adapted to steam-power, to be controlled by the engineer of an engine.

Having thus described my invention, I claim—

1. The combination of the axle A, the sliding eccentrics placed thereon, and a mechanism for moving them back and forth, with a brake mechanism which is operated by the eccentrics, substantially as shown.

2. The combination of the axle A, the sliding eccentrics placed thereon, and an operating mechanism for moving them back and forth, with the lever c, rod b, wheel F, and the brake-connections, substantially as set forth.

3. The combination of the lever c, rod b, wheel F, and the brake-connections, with the hanger i, chain i', and shaft J, substantially as described.

In testimony whereof I affix my signature in presence of two witnesses.

ADAM HOFFMANN.

Witnesses:
LOUIS MOESER,
T. F. LEHMANN.